Figure 1:
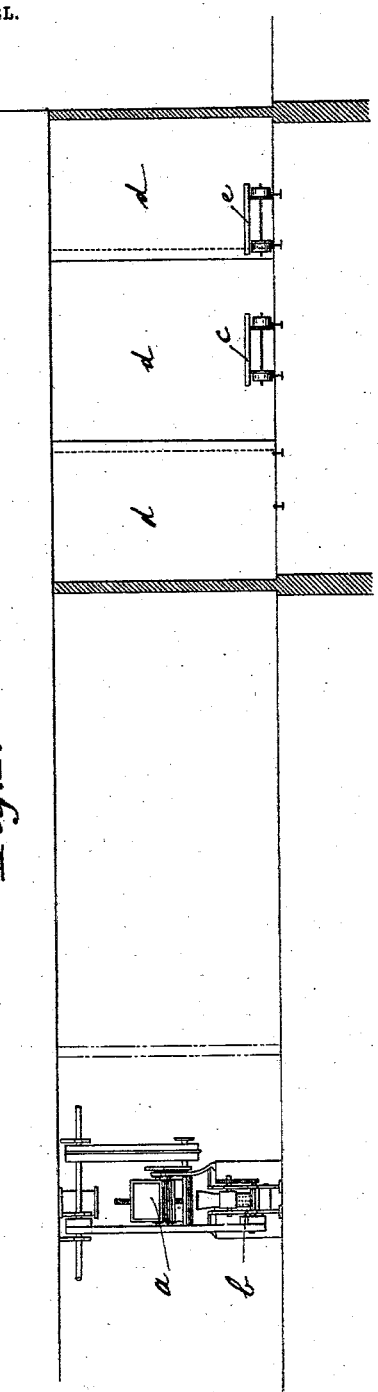

No. 758,346. PATENTED APR. 26, 1904.
O. AVEDYK.
PROCESS OF MAKING FLOUR NON-HYGROSCOPIC.
APPLICATION FILED AUG. 3, 1900.

NO MODEL.

No. 758,346. Patented April 26, 1904.

UNITED STATES PATENT OFFICE.

OCTAVE AVEDYK, OF BRUSSELS, BELGIUM.

PROCESS OF MAKING FLOUR NON-HYGROSCOPIC.

SPECIFICATION forming part of Letters Patent No. 758,346, dated April 26, 1904.

Application filed August 3, 1900. Serial No. 25,732. (No specimens.)

*To all whom it may concern:*

Be it known that I, OCTAVE AVEDYK, a subject of the King of Belgium, residing at 65 Rue Royale, Brussels, in the Kingdom of Belgium, have invented a new and useful Process of Making Flour Non-Hygroscopic, (for which applications for patents have been filed in Belgium on February 28, 1900, granted March 15, 1900, No. 148,232; in France on March 1, 1900, granted June 14, 1900, No. 297,736; in Germany on April 14, 1900; in Austria on April 18, 1900; in England on April 19, 1900; in Hungary on April 20, 1900; in Italy on April 21, 1900; in Russia on April 18, 1900, and in Spain on April 23, 1900,) of which the following is a full, clear, and exact description.

The subject of the present invention is a process for treating meal in general, and more especially white-wheat flours obtained by the various grinding systems now in use, for the purpose of changing the properties of said flours or meals so that they may no longer be affected by atmospheric influences, notably considerable variations in humidity, without, nevertheless, injuring their gluten or any of the original diastasic properties indispensable for their perfect panification, which they lose when they are exposed to atmospheres the humidity of which exceeds the normal of the temperate zones and much more rapidly when the temperature is at the same time higher—as, for instance, in the tropics.

The defects which constitute a real misfortune for commerce in the products of the milling industry are due to the great propensity of flour to absorb the humidity of its surroundings, which inevitably causes it to deteriorate when the hygroscopic condition of such surroundings allows of its absorbing more than from twenty per cent. to twenty-two per cent. of water and when it cannot be used or worked up immediately—that is, when it is stored under these conditions, as it then ferments and turns moldy. On the other hand, the maximum proportion of twenty per cent. to twenty-two per cent. of water, which is not unusual, not to say normal, and which flour can contain without undergoing immediate deterioration, constitutes a considerable loss for the purchaser, who pays the same price for this one-fifth part of water as for the flour, a loss to which must be added the expense caused by the necessary precautions for its preservation during transport and storage until the flour is finally utilized. It is accordingly on these conditions that flours having their natural diastasic and fermentable qualities can be handled in temperate climates; but even this is not possible in equatorial countries, where they are absolutely not preservable under ordinary conditions. Various means have therefore been devised for rendering flour capable of being exported without, however, succeeding in preserving its necessary qualities for making good bread. The method generally employed consists in inclosing the flour in hermetically-sealed metal cases; but during its passage across the equator the flour sweats, owing to exposure to a high temperature in the air-tight boxes, and is converted into dextrine, altering it to such a degree that when it reaches its destination its diastasic properties are impaired, the gluten altered, and consequently leavening action to a great degree prevented, so that when made into bread it only gives doughy and tasteless products. In order to obviate these defects, it has been sought to remove the water contained in the flour prior to its being packed and to dry the flour in ovens at the requisite temperature and finally pack it in boxes; but it has been ascertained that no satisfactory result is attainable by this process—that is to say, the endeavor to deprive flour by simple dessication of the humidity absorbed has proved fruitless, as flour thus treated goes bad again in the closed vessels. The condition of the flour, moreover, is not changed by treating it in an open drying apparatus unless the temperature be raised to roasting-point, as in the process known as "stoving," which causes the opening up of the smallest particles, allowing the water they inclose to escape; but the flour thus obtained is transformed or disorganized and rendered unfit for use. Having ascertained these facts, I have sought for means permitting of the physical state of the flour being changed in such a manner as to deprive it of its tendency to become moist without injuring any of its natural qualities, a problem which has been paradoxically solved by a treatment with water previous to drying for the purpose indicated and which forms the object of the present invention.

It has been ascertained that an opening up of the constituent particles of the flour is attained by treating it with an excess of water sufficient to convert it into a paste of homogeneous density, and by afterward suitably dessicating this paste in a drying apparatus under the action of a current of air at a suitable temperature the particles of flour are entirely deprived of their moisture, which the current of air carries away while oxygenating the paste without changing any of the properties of the floor, which reappears with all its original whiteness; but above all with this valuable quality in addition that in this new state it no longer absorbs to an injurious extent the moisture of the surrounding atmosphere—that is to say, the absorption is limited to an imperceptible degree incapable of deteriorating the flour, so that this dry flour is unchanged by atmospheric influences and is on this account adapted for transport and export without requiring more special precautions and packing than the ordinary sacks. Although any appliances capable of carrying out the necessary operations for obtaining this result may be used, the process which has been actually followed is described below for greater clearness.

As soon as the conversion of the flour into paste is in progress it is important that it should be passed into the drying apparatus without being kept in the kneading-trough and that the drying should take place rapidly, so as not to leave time for the paste to be affected by the action of the diastase, which of course would alter the quality of the final product. In order to insure this, recourse may be had to various suitable processes for arresting the action of the diastase while remaining quite harmless for the flour.

The operation of converting ordinary flour into non-hygroscopic flour takes place in the following manner, as described with reference to the annexed drawings, in which—

Figure 2:
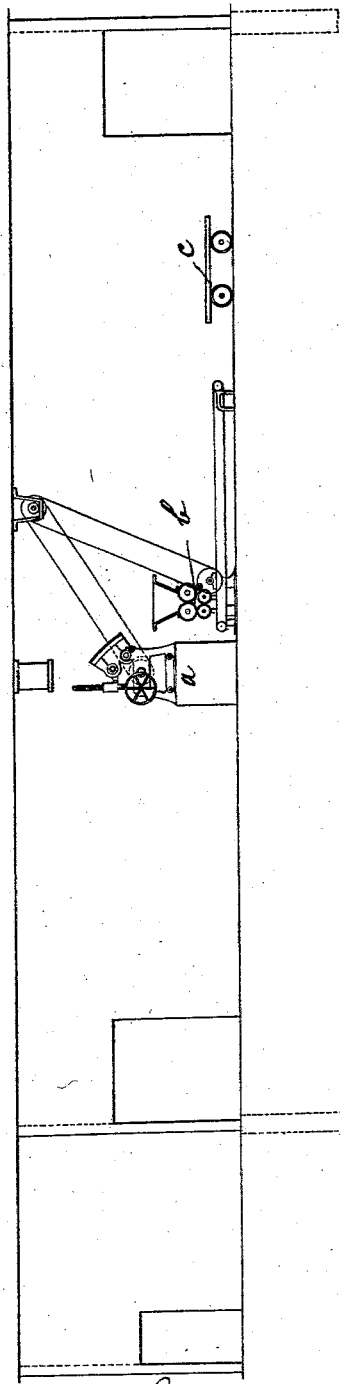

Figure 1 is a transverse section of the converting-room and the adjacent drying-room; Fig. 2, a longitudinal vertical section of the converting-room, the necessary apparatuses of which are shown in both of these figures. The arrangement of these rooms and the machines used therewith may be made in any convenient manner.

The flour is first converted in paste in the kneading-trough $a$ and then passed between a set of rollers $b$, which convert it into very thin sheets or strips, which are received on an endless tray and from this on small wagons $c$, which are immediately entered and passed through the drying-room $d$ during the period required for expelling the water from the flour bands or sheets. On coming out of the drying apparatus the strips or sheets are received in a suitable crusher which reduces them to small fragments, which are in turn delivered to a suitable roller-mill, which reconverts them into very fine white flour, but of a more granular nature, having all the properties set forth above without the hygroscopic defects of ordinary flour.

Having thus described my invention, the following is what I claim as new therein and desire to secure by Letters Patent:

The process of making non-hygroscopic flour which consists in first grinding the grain and removing offal; then soaking the ground and cleansed flour in water at moderate temperature to avoid cooking; then kneading to form a dough; then reducing the dough to sheets or films by passing the dough through rollers; then thoroughly desiccating the same, also at moderate temperature; and finally, regrinding the desiccated product to obtain an uncooked product unsusceptible to atmospheric influences, and having its fermentible properties unimpaired.

In witness whereof I have hereunto set my hand in presence of two witnesses.

OCTAVE AVEDYK.

Witnesses:
EDWARD P. MACLEAN,
GEORGE E. LIGHT.